(12) United States Patent
Kiya et al.

(10) Patent No.: US 7,771,864 B2
(45) Date of Patent: Aug. 10, 2010

(54) METHOD OF DETECTING AND RESPONDING TO A COOLING SYSTEM FAILURE IN A POWER SUPPLY DEVICE

(75) Inventors: Nobuaki Kiya, Toyota (JP); Junta Katayama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1023 days.

(21) Appl. No.: 10/590,235

(22) PCT Filed: Aug. 19, 2005

(86) PCT No.: PCT/JP2005/015498

§ 371 (c)(1),
(2), (4) Date: Aug. 22, 2006

(87) PCT Pub. No.: WO2006/022362

PCT Pub. Date: Mar. 2, 2006

(65) Prior Publication Data

US 2007/0178346 A1     Aug. 2, 2007

(30) Foreign Application Priority Data

Aug. 25, 2004   (JP) .............................. 2004-245194

(51) Int. Cl.
*H01M 10/50*   (2006.01)
*H01M 8/04*    (2006.01)
*H01M 16/00*   (2006.01)

(52) U.S. Cl. .............................. 429/62; 429/9; 429/120; 429/434

(58) Field of Classification Search .................... 429/26, 429/29, 62, 9, 120; 73/431; 323/284; 361/679.48; 701/29; 324/430
See application file for complete search history.

(56) References Cited

U.S. PATENT DOCUMENTS 4,870,863 A * 10/1989 Duncan et al. ................. 73/431

(Continued)

FOREIGN PATENT DOCUMENTS

EP    0 964 470 A1    12/1999

(Continued)

OTHER PUBLICATIONS

Russian Language Version of Decision on Grant, Appln. No. 2006144698/09(048791) issued on Sep. 14, 2007.

(Continued)

*Primary Examiner*—Jonathan Crepeau
*Assistant Examiner*—Kenneth Douyette
(74) *Attorney, Agent, or Firm*—Kenyon & Kenyon LLP

(57) ABSTRACT

A cooling fan of a secondary battery and a cooling fan of a DC/DC converter are arranged in parallel to share the same air discharge path. A temperature sensor on an air intake side and a temperature sensor on an air discharge side are attached to the secondary battery. When the cooling fan is in failure, a temperature deviation between the air intake side and the air discharge side in the secondary battery increases because a backflow component of a discharge air is generated through the discharge path as the cooling fan operates. Based on this phenomenon, when operation commands for both of the cooling fans are issued, the control circuit senses a failure in the cooling fan by monitoring the temperature difference between temperatures detected by the temperature sensors. Failure detection is thereby possible without providing a sensor at each of the cooling fans.

18 Claims, 4 Drawing Sheets

U.S. PATENT DOCUMENTS

| | | | |
|---|---|---|---|
| 5,548,206 A * | 8/1996 | Soo | 323/284 |
| 5,796,580 A * | 8/1998 | Komatsu et al. | 361/679.48 |
| 6,213,060 B1 | 4/2001 | Kuze | |
| 6,289,666 B1 | 9/2001 | Ginter | |
| 6,377,880 B1 | 4/2002 | Kato et al. | |
| 6,538,412 B1 | 3/2003 | Klose et al. | |
| 2002/0079866 A1 | 6/2002 | Odaohhara | |
| 2003/0067747 A1 | 4/2003 | Hasegawa et al. | |
| 2003/0118891 A1 | 6/2003 | Saito et al. | |
| 2004/0257089 A1 * | 12/2004 | Aridome | 324/430 |

FOREIGN PATENT DOCUMENTS

| | | |
|---|---|---|
| JP | 10-012287 | 1/1998 |
| JP | 2001-086601 A | 3/2001 |
| JP | 2001-210389 A | 8/2001 |
| JP | 2001-313092 A | 11/2001 |
| JP | 2002-343449 A | 11/2002 |
| JP | 2003-112531 A | 4/2003 |
| JP | 2003-178815 A | 6/2003 |
| JP | 2004-306726 A | 11/2004 |
| RU | 2 126 490 C1 | 2/1999 |
| RU | 2 144 869 | 1/2000 |
| RU | 2 156 364 C2 | 9/2000 |
| RU | 2 183 570 C1 | 6/2002 |

OTHER PUBLICATIONS

English Translation of Decision on Grant, Appln. No. 2006144698/09(048791) issued on Sep. 14, 2007.

* cited by examiner

FIG.7

|  | CONVERTER TEMPERATURE Td ||
|  | >Tdr (DC/DC CONVERTER REQUIRES COOLING) | ≦Tdr (DC/DC CONVERTER REQUIRES NO COOLING) |
| --- | --- | --- |
| BATTERY TEMPERATURE Tb — >Tbr (SECONDARY BATTERY REQUIRES COOLING) | OPERATE BOTH OF COOLING FANS 30, 40 | COOLING FAN 30: OPERATION (COOLING) COOLING FAN 40: INOPERATIVE |
| BATTERY TEMPERATURE Tb — ≦Tbr (SECONDARY BATTERY REQUIRES NO COOLING) | COOLING FAN 30: AUXILIARY OPERATION COOLING FAN 40: OPERATION (COOLING) | BOTH OF COOLING FANS 30, 40: INOPERATIVE |

METHOD OF DETECTING AND RESPONDING TO A COOLING SYSTEM FAILURE IN A POWER SUPPLY DEVICE

This is a 371 application of PCT/JP2005/015498 filed on 19 Aug. 2005, claiming priority to Japanese Application No. 2004-245194 filed on 25 Aug. 2004, the contents of which are incorporated herein by reference.

FIELD OF THE INVENTION

The present invention relates to a power supply device, and more particularly to failure detection of cooling systems and coordinated control between the cooling systems in a power supply device provided with a plurality of voltage generators and the cooling systems.

BACKGROUND OF THE INVENTION

A power supply system including a secondary battery is used in various equipment and systems, a typical example of which is a hybrid vehicle. The secondary battery has a temperature range in which the charging efficiency thereof is sharply reduced when the temperature of the secondary battery itself rises by heat generated as the secondary battery is charged and discharged. Therefore, such a power supply system requires a cooling system for a secondary battery.

For this type of a secondary battery cooling system, there has conventionally been proposed a configuration that controls on/off of a cooling fan in accordance with the temperature of the secondary battery to cool the secondary battery. The cooling fan is operated to prevent the temperature rise so that the temperature of the secondary battery can be kept within an appropriate temperature range.

However, an anomaly may occur in the secondary battery cooling system. For example, there may be a case where the cooling fan is made inoperable because of wire breaking and others, or a case where the cooling fan is made uncontrollable because of an anomaly of the control system thereof and others. Alternatively, a cooling air path may be clogged with dust so that the circulation of air serving as a cooling medium is blocked, although neither mechanical nor electrical anomaly occurs in the cooling system. Such an anomaly of the cooling fan directly affects the cooling state of the secondary battery, and hinders the secondary battery in use from delivering a desired performance. In view of these points, various configurations that detect a failure of the secondary battery cooling fan have been proposed.

For a power supply device provided with a cooling fan for cooling a secondary battery, for example, there has been proposed a configuration that calculates an assumed amount of temperature change of the battery, from input and output power and a temperature difference between the temperatures of the battery and a cooling medium, and based on the result of comparison between the assumed amount of temperature change and an actual amount of temperature change, senses a failure of the battery cooling fan (e.g. in Japanese Patent Laying-Open No. 2001-86601).

Alternatively, there has been proposed, for example, a configuration that monitors the temperature of cooling air after a driving signal is output to a battery cooling fan, and detects a failure of the cooling fan if an amount of temperature drop of the cooling air is small (e.g. in Japanese Patent Laying-Open No. 2001-210389), or a configuration that senses a failure of a cooling system if a deviation of an actual battery temperature from an expected battery temperature, which is calculated from charge and discharge current and a cooling state, is large (e.g. in Japanese Patent Laying-Open No. 2001-313092).

However, if another power supply (voltage generator), which can be a heat generation source, is disposed in proximity to the secondary battery, a configuration for efficiently cooling both of them is required. For a power supply device in which a DC/DC converter that supplies a power supply voltage to other equipment and others is disposed in proximity to the secondary battery, for example, such a configuration is required.

Such a power supply device adopts a configuration in which individual cooling fans are provided to correspond to the secondary battery and the DC/DC converter, respectively, and arranged in parallel, to ensure sufficient cooling capacity for both of the secondary battery and the DC/DC converter.

In such a configuration with parallel arrangement, the cooling fans may be in proximity to each other, and flows of air serving as a cooling medium (coolant) may affect each other. It is therefore necessary to control both of the cooling fans in a coordinated manner. In a configuration in which a revolution speed sensor and others are disposed to detect a failure of the cooling fans, the number of failure detection sensors to be disposed increases as the number of the cooling fans to be disposed increases, which result in cost increase. If a malfunction of the failure detection sensors themselves is considered, in particular, reliability of the failure detection is decreased as the number of the cooling fans to be disposed increases.

Accordingly, in a power supply device provided with a plurality of cooling fans, it is desirable to detect a failure of the cooling fans without providing a sensor that detects an operating state of the cooling fans.

SUMMARY OF THE INVENTION

The present invention is made to overcome such a problem. An object of the present invention is to, in a power supply device that adopts a cooling configuration where cooling systems are provided in parallel to correspond to a plurality of voltage generators, respectively, enable failure detection of the cooling systems without providing a sensor that detects an operating state of each of the cooling systems.

Another object of the present invention is to, in the power supply device that adopts the cooling configuration above, provide coordinated control between the plurality of cooling systems arranged in parallel to sufficiently cool each of the voltage generators.

A power supply device according to the present invention includes: a first voltage generator; a second voltage generator; a first cooling system; a second cooling system; a coolant discharge path; first and second temperature sensors; and a control circuit. The first voltage generator has a first coolant path allowing a coolant for cooling the first voltage generator to pass therethrough. The second voltage generator has a second coolant path allowing the coolant for cooling the second voltage generator to pass therethrough. The first cooling system supplies the coolant to a coolant intake side of the first coolant path. The second cooling system supplies the coolant to a coolant intake side of the second coolant path. The coolant discharge path is connected to both of a coolant discharge side of the first coolant path and a coolant discharge side of the second coolant path. The first temperature sensor is attached to the first voltage generator. The second temperature sensor is attached to the first voltage generator on the coolant discharge side of the first coolant path, relative to the first temperature sensor. The control circuit controls an operation of each of the first and second cooling systems. When the control circuit issues an operation instruction to each of the first and second cooling systems, in particular, the control circuit detects failure in the first cooling system when a temperature difference between temperature detected by the first temperature sensor and temperature detected by said second temperature sensor is larger than a reference value.

In the power supply device above, the first and second cooling systems are arranged in parallel, with a coolant discharge path (e.g. air discharge path) shared by them. Therefore, when the first cooling system is in failure, a backflow of the discharged coolant (a typical example of which is a discharge air) is generated through the coolant discharge path, as the second cooling system operates. Based on the phenomenon, in accordance with the a temperature difference between the coolant intake side (air intake side) and the coolant discharge side (air discharge side) of the first voltage generator increasing to be larger than a prescribed reference value, a failure in the first cooling system can efficiently be detected without providing at the first cooling system a failure detection sensor such as a revolution speed sensor.

Preferably, the power supply device according to the present invention further includes a third temperature sensor. The third temperature sensor is attached to the second voltage generator. Furthermore, when the control circuit operates the second cooling system to cool the second voltage generator based on a temperature detected by the third temperature sensor, the control circuit also operates the first cooling system in an auxiliary manner to prevent the coolant discharged from the second coolant path from flowing back to the first coolant path through the coolant discharge path even when it is determined that cooling of the first voltage generator is unnecessary based on the temperatures detected by the first and second temperature sensors.

In the power supply device above, when the second cooling system is operated, the first cooling system is operated in an auxiliary manner even when it is determined that cooling of the first voltage generator is unnecessary. It is therefore possible to prevent a backflow of the coolant discharged from the coolant path of the second voltage generator to the coolant path of the first voltage generator through the common coolant discharge path (air discharge path). As a result, when the first cooling system is in a normal state, it is possible to reduce a temperature deviation between the coolant intake side (air intake side) and the coolant discharge side (air discharge side) of the first voltage generator.

Preferably, in the power supply device according to the present invention, a flow rate of the coolant from the first cooling system when the first cooling system is operated in the auxiliary manner is set to be lower than a flow rate of the coolant when the first cooling system is operated to cool the first voltage generator.

In the power supply device above, the flow rate of the coolant in the first cooling system when the first cooling system is operated in an auxiliary manner, can be made lower than that of the coolant when the first cooling system cools the first voltage generator, and specifically, can be restricted to a level required for preventing a backflow of the discharged coolant (warm discharge air) through the coolant discharge path (air discharge path). As a result, it is possible to reduce driving power for, and noise generation of, the first cooling system, when compared with the case where the coolant flow rates in an auxiliary operation and during cooling are set to the same value.

More preferably, in the power supply device according to the present invention, the first voltage generator is a secondary battery, and the second voltage generator is a power converter having a semiconductor power switching element embedded therein.

In the power supply device above that adopts a configuration where the secondary battery and the power converter, and the respective cooling systems thereof are arranged in parallel, it is possible to efficiently detect a failure in the cooling system corresponding to the secondary battery where the temperature deviation in the device increases, based on the temperatures detected by the plurality of temperature sensors attached to the secondary battery.

Alternatively, a power supply device according to the present invention includes: a first voltage generator; a second voltage generator; a first cooling system; a second cooling system; a coolant discharge path; and a control circuit. The first voltage generator has a first coolant path allowing a coolant for cooling the first voltage generator to pass therethrough. The second voltage generator has a second coolant path allowing the coolant for cooling the second voltage generator to pass therethrough. The first cooling system supplies the coolant to a coolant intake side of the first coolant path. The second cooling system supplies the coolant to a coolant intake side of the second coolant path. The coolant discharge path is connected to both of a coolant discharge side of the first coolant path and a coolant discharge side of the second coolant path. The control circuit controls an operation of each of the first and second cooling systems. When the control circuit operates one cooling system of the first and second cooling systems, in particular, the control circuit also operates the other cooling system of the first and second cooling systems even when cooling of the voltage generator corresponding to the other cooling system is unnecessary.

In the power supply device above, the first and second cooling systems are arranged in parallel, with the coolant discharge path (discharge path) shared by them. Therefore, when only one of the cooling systems is operated, there is a possibility of the temperature rise of the voltage generator corresponding to the other of the cooling systems, due to a backflow of the discharged coolant (warm discharge air) through the coolant discharge path. Accordingly, when one of the cooling systems is operated, the other of the cooling systems is also operated even when cooling of the voltage generator that corresponds thereto is unnecessary. By doing so, it is possible to prevent the generation of the above-described backflow of the discharged coolant (warm discharge air) and sufficiently cool each of the voltage generators.

Preferably, in the power supply device according to the present invention, the control circuit controls the operation of each of the first and second cooling systems, based on an output of each of temperature sensors provided at the first and second voltage generators.

In the power supply device above, an operation of each of the cooling systems is controlled based on a value actually measured by each of the temperature sensors, and hence each of the voltage generators can more reliably be maintained at not more than the control target temperature.

More preferably, in the power supply device according to the present invention, when the control circuit operates the one cooling system, and when the control circuit also operates the other cooling system even when cooling of the voltage generator corresponding to the other cooling system is unnecessary, the control circuit sets a flow rate of the coolant from the one cooling system to be relatively higher than a flow rate of the coolant from the other cooling system.

In the power supply device above, the flow rate of the coolant in the cooling system when the cooling system is operated in an auxiliary manner even when coolant supply is originally unnecessary, can be made lower than that of the coolant from the cooling system operated to cool the voltage generator, and specifically, can be restricted to a level required for preventing a backflow of the discharged coolant (warm discharge air) through the coolant discharge path (air discharge path). As a result, it is possible to reduce power consumption and noise generation in the cooling system in an auxiliary operation, when compared with the case where the coolant flow rates are set to the same value.

Alternatively, in the power supply device according to the present invention, the control circuit preferably controls the operation of the first cooling system such that the first voltage generator is maintained to be at not more than a first reference temperature, and controls the operation of the second cooling system such that the second voltage generator is maintained to be at not more than a second reference temperature. The first reference temperature is lower than the second reference temperature. Furthermore, when the control circuit operates the second cooling system to cool the second voltage generator, the control circuit also operates the first cooling system even when cooling of the first voltage generator is unnecessary.

In the power supply device above, when the voltage generators have different reference temperatures each serving as a control target, only the first cooling system corresponding to the voltage generator having a lower reference temperature is allowed to be a cooling system operated in an auxiliary manner to prevent a backflow of the discharged coolant even when cooling is unnecessary. In other words, in view of the fact that a backflow of the discharged coolant from the voltage generator that has a lower reference temperature to the voltage generator that has a higher reference temperature has less adverse effect on temperature rise in the voltage generator, an auxiliary operation described above is not executed in the second cooling system corresponding to the voltage generator that has a higher reference temperature, which can reduce power consumption and noise generation therein.

More preferably, in the power supply device according to the present invention, when the control circuit operates the second cooling system, and when the control circuit also operates the first cooling system even when cooling of the first voltage generator is unnecessary, the control circuit sets a flow rate of the coolant from the second cooling system is set to be relatively higher than a flow rate of the coolant from the first cooling system.

In the power supply device above, the flow rate of the coolant in the cooling system (first cooling system) operated in an auxiliary manner when cooling is unnecessary can be made lower than that of the coolant from the cooling system (second cooling system) operated for cooling the voltage generator, and specifically, can be restricted to a level required for preventing a backflow of the discharged coolant (discharge air) through the coolant discharge path (air discharge path). As a result, it is possible to reduce power consumption and noise generation in the first cooling system in an auxiliary operation, when compared with the case where the coolant flow rates are set to the same value.

Preferably, the power supply device according to the present invention further includes first and second ducts. The first duct is provided between a discharge side of the first cooling system and the first coolant path. The second duct is provided to branch off from the first duct. Furthermore, an intake side and a discharge side of the second cooling system are coupled to the second duct and the second coolant path, respectively.

In the power supply device above, the coolant can be supplied from each of the first and second cooling systems, only by providing a coolant introduction path on the intake side of the first cooling system. Furthermore, the coolant discharge path (air discharge path) can also be shared by the first and second cooling systems, and hence both of the first and second voltage generators can be cooled with the compact cooling configuration.

More preferably, in the power supply device according to the present invention, the control circuit controls the operation of each of the first and second cooling systems such that the first and second voltage generators are maintained to be at not more than control target temperatures, respectively. In particular, the first voltage generator is a secondary battery, and the second voltage generator is a power converter having a semiconductor power switching element embedded therein. The control target temperature of the power converter is higher than the control target temperature of the secondary battery.

In the power supply device above that adopts a configuration where the secondary battery and the power converter, and the respective cooling systems thereof are arranged in parallel, it is possible to sufficiently cool the secondary battery and the power converter by preventing, in particular, the generation of a backflow of the discharged coolant (discharge air) to the secondary battery having a relatively low control target temperature.

Accordingly, in the power supply device according to the present invention, the power supply device adopting a configuration where the cooling systems corresponding to the plurality of voltage generators, respectively, are arranged in parallel and the coolant discharge path (air discharge path) is shared, a failure in the cooling systems can be detected without providing a sensor that detects an operating state of each of the cooling systems.

Furthermore, in the power supply device according to the present invention, the power supply device adopting a configuration where the cooling systems corresponding to the plurality of voltage generators, respectively, are arranged in parallel, and the coolant discharge path (air discharge path) is shared, the respective voltage generators can sufficiently be cooled by providing coordinated control among the cooling systems.

BRIEF DESCRIPTION OF THE DRAWINGS

FIG. 7 is a drawing for describing an operational control of the cooling fan in each case of the power supply devices shown in FIGS. 1 and 6.

DETAILED DESCRIPTION

Figure 1:
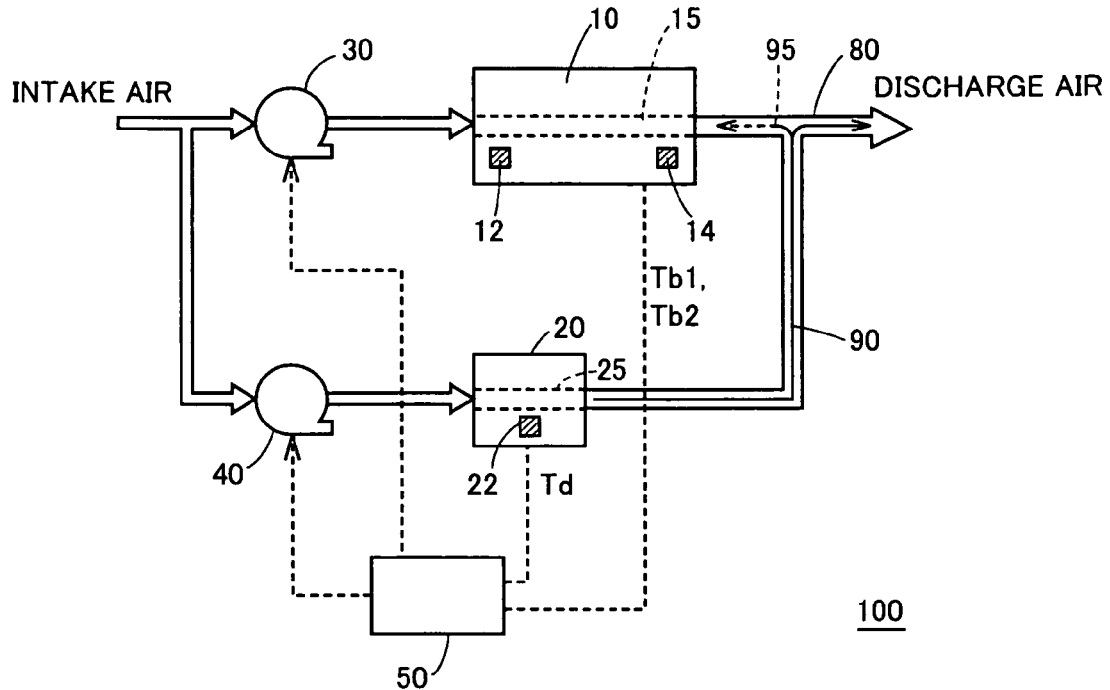
FIG. 1 is a block diagram for describing an example of a configuration of a power supply device according to an embodiment of the present invention.

An embodiment of the present invention will hereinafter be described in detail with reference to the drawings. In the following, the same or corresponding portions are denoted by the same reference characters and the description thereof will not be repeated in principle.

FIG. 1 is a block diagram showing a configuration of a power supply device 100 according to an embodiment of the present invention.

Referring to FIG. 1, power supply device 100 includes a secondary battery 10 shown as a typical example of a "first power supply (voltage generator)", a DC/DC converter 20 shown as a typical example of a power converter corresponding to a "second power supply (voltage generator)", a cooling fan 30 provided to correspond to secondary battery 10, and a cooling fan 40 provided to correspond to DC/DC converter 20, and an electronic control unit (ECU) 50.

In power supply device 100, cooling fan 30 corresponds to a "first cooling system" in the present invention, while cooling fan 40 corresponds to a "second cooling system" in the present invention. ECU 50, which corresponds to a "control circuit" in the present invention, is formed of a microcomputer, a memory and others for executing a series of preprogrammed processing.

Secondary battery 10 has a coolant path 15. Cooling fan 30 delivers a coolant (a typical example of which is air) taken in to an air intake side (coolant intake side) of coolant path 15. As the coolant from cooling fan 30 passes through coolant path 15, heat exchange occurs between the coolant and secondary battery 10, and the coolant is then discharged to an air discharge path 80 connected to an air discharge side (coolant discharge side) of coolant path 15.

Similarly, DC/DC converter 20 has a coolant path 25. Cooling fan 40 delivers the coolant taken in to an air intake side (coolant intake side) of coolant path 25. As the coolant from cooling fan 40 passes through coolant path 25, heat exchange occurs between the coolant and DC/DC converter 20, and the coolant is then discharged to air discharge path 80 connected to an air discharge side (coolant discharge side) of coolant path 25. In other words, air discharge path 80 corresponds to a "coolant discharge path" in the present invention.

Although the shape and others of coolant paths 15 and 25 are designed to obtain sufficient cooling efficiency in secondary battery 10 and DC/DC converter 20, cooling paths 15 and 25 are schematically shown with straight lines in FIG. 1.

As such, the air discharge sides of coolant paths 15 and 25 are connected to common air discharge path 80, and hence the coolant discharged after heat exchange from secondary battery 10 and the coolant discharged after heat exchange from DC/DC converter 20 are discharged in an integrated manner. Air discharge path 80 is disposed in proximity to cooling fan 30 that delivers a large amount of coolant for cooling secondary battery 10, and thus discharge air 90 output from DC/DC converter 20 may have a backflow component 95 that flows back to the secondary battery 10 side, in addition to a component that flows towards air discharge path 80.

Heat generating property of secondary battery 10 and DC/DC converter 20 will hereinafter be described.

Secondary battery 10 is relatively large, and generates heat by an electrochemical reaction caused with charge and discharge operation. Therefore, an energy density at which heat is generated is relatively small, and a heat generation area becomes large, which tends to cause a large temperature deviation inside the device. It is therefore necessary to provide a plurality of temperature sensors at secondary battery 10. In this embodiment, at least temperature sensors 12, 14 are provided at secondary battery 10, and the temperature sensors 12, 14 are attached to the air intake side (coolant intake side), which is in proximity to cooling fan 30, and the air discharge side (coolant discharge side), which is in proximity to air discharge path 80, respectively.

It is difficult to attach temperature sensors 12, 14 inside a battery cell, and hence temperature sensors 12, 14 are attached, to the surface of a package of the battery cell, to correspond to the portions of a structure that has relatively high temperature conductivity from an inside of the battery cell. A temperature Tb1 detected by temperature sensor 12 and a temperature Tb2 detected by temperature sensor 14 are output to control circuit 50.

In contrast, in DC/DC converter 20, a semiconductor power switching element (not shown) embedded therein generates heat with a high frequency switching operation. Therefore, in DC/DC converter 20, an energy density at which heat is generated is relatively large, and a heat generation area becomes small. Accordingly, DC/DC converter 20 has a higher rate and a larger amount of temperature rise in operation. In this embodiment, a single temperature sensor 22 is therefore provided at DC/DC converter 20. Temperature sensor 22 is attached to correspond to a place where the semiconductor power switching element is disposed. A temperature Td detected by temperature sensor 22 is output to control circuit 50.

Control circuit 50 controls operations of cooling fans 30, 40, in other words, an operative state (ON) and an inoperative state (OFF) of each of the cooling fans, and a set flow rate of the coolant in operation, based on temperatures Tb1, Tb2, and Td detected by temperature sensors 12, 14, and 22. Specifically, the revolution speed of each of the cooling fans is controlled in accordance with the set flow rate of the coolant. In the following, temperatures Tb1, Tb2 detected by temperature sensors 12, 14 provided at secondary battery 10 are also referred to as "battery temperatures", while temperature Td detected by temperature sensor 22 provided at DC/DC converter 20 is also referred to as a "converter temperature".

In power supply device 100, temperature sensor 12 corresponds to a "first temperature sensor" in the present invention, while temperature sensor 14 corresponds to a "second temperature sensor" in the present invention. Temperature sensor 22 corresponds to a "third temperature sensor" in the present invention.

Operations of cooling fans 30, 40 will hereinafter be described with reference to FIGS. 2 and 3.

Figure 2:
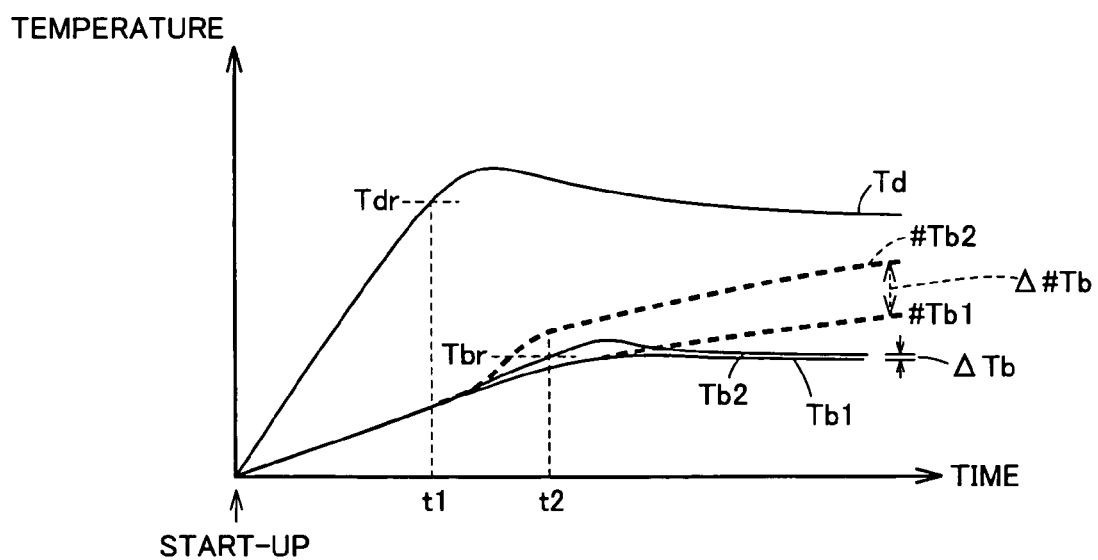
FIG. 2 is a drawing for describing a transition of the temperatures of a secondary battery and a DC/DC converter in the power supply device shown in FIG. 1.

Referring to FIG. 2, the start-up of power supply device 100 causes converter temperature Td and battery temperatures Tb1, Tb2 to begin rising together. At the start-up of power supply device 100, both of secondary battery 10 and DC/DC converter 20 still have small amounts of temperature rise, and hence both of cooling fans 30, 40 are made inoperative (OFF) by control circuit 50, as shown in FIG. 3.

Referring to FIG. 2 again, after the start-up of power supply device 100, the temperatures of secondary battery 10 and DC/DC converter 20 gradually rise owing to heat generated at secondary battery 10 and DC/DC converter 20. As described above, a relatively larger amount of heat is generated at DC/DC converter 20, and hence converter temperature Td has a higher rising rate than battery temperatures Tb1, Tb2.

Accordingly, an operation instruction is issued to cooling fan 40 at time t1 in response to converter temperature Td exceeding a reference temperature Tdr. Specifically, as shown in FIG. 3, control circuit 50 issues a revolution speed command, which corresponds to a prescribed set flow rate X1 of the coolant, to cooling fan 40, and thereby cooling fan 40 is switched from an off-state to an on-state. Converter temperature Td is thereby prevented from rising after time t1.

In contrast, the temperature of secondary battery 10 slowly rises, and hence at time t1, battery temperatures Tb1, Tb2 have not yet risen to a level at which cooling is required. However, in order to prevent the generation of a backflow component 95, shown in FIG. 1, of discharge air 90 from DC/DC converter, control circuit 50 not only operates cooling fan 40 but also operates cooling fan 30 in an auxiliary manner. Specifically, a revolution speed command that corresponds to a set flow rate Y1 of the coolant in an auxiliary operation is issued from control circuit 50 to cooling fan 30. Accordingly, discharge air 90, shown in FIG. 1, from DC/DC converter is introduced into air discharge path 80 without flowing back to coolant path 15 of secondary battery 10.

Referring to FIG. 2 again, cooling fans 30 and 40 operate in a coordinated manner as described above, and thereby battery temperatures Tb1 (on the air intake side) and Tb2 (on the air discharge side) keep rising without allowing a temperature difference ΔTb between them (ΔTb=|Tb1−Tb2|) to increase significantly.

At the subsequent time t2, control circuit 50 determines that secondary battery 10 requires cooling, in response to at least one of battery temperatures Tb1, Tb2 exceeding a reference temperature Tbr.

Figure 3:
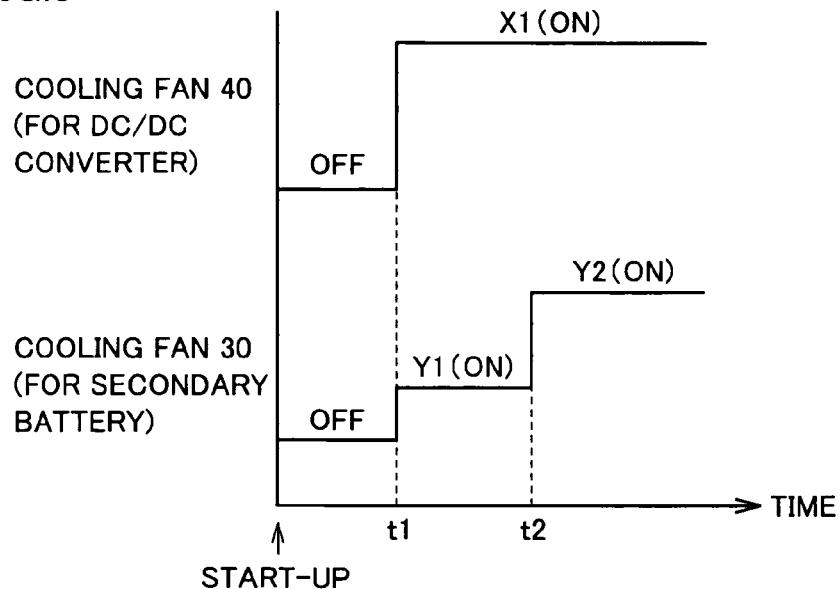
FIG. 3 is a drawing for describing an example of an operation of a cooling fan shown in FIG. 1.

Accordingly, as shown in FIG. 3, control circuit 50 issues a revolution speed command that corresponds to a set flow rate Y2 of the coolant during cooling, to cooling fan 30. In cooling fan 30, set flow rate Y2 of the coolant during cooling is set to be higher than set flow rate Y1 of the coolant in an auxiliary operation. As such, the set flow rate of the coolant when cooling fan 30 operates in an auxiliary manner that requires no cooling, is restricted to a level required to prevent a backflow of the discharge air, and thereby it is possible to save driving power for cooling fan 30, when compared with the case where flow rates of the coolant in an auxiliary operation and during cooling are set to the same value.

As to the operations of cooling fans 30, 40, set flow rates X1, Y2 of the coolant during cooling (FIG. 3) may be set in a plurality of stages, in accordance with detected temperatures Tb1, Tb2, Td.

Referring to FIG. 2 again, an amount of the coolant for actively cooling secondary battery 10 is supplied from cooling fan 30, as described above, and thereby battery temperatures Tb1, Tb2 are prevented from rising. In particular, a backflow of discharge air 90 from DC/DC converter 20 is not generated, and hence temperature difference ΔTb between battery temperatures Tb1, Tb2 is maintained to be relatively small.

In contrast, the battery temperature when cooling fan 30 is in failure exhibits transition as shown by reference characters #Tb1 and #Tb2 in FIG. 3.

As described above, causes of failure in a cooling fan may includes an electrical anomaly such as wire breaking, inoperability due to a mechanical failure, and uncontrollability due to an anomaly of the control system. Alternatively, a cooling air path may be clogged with dust, for example, to block the circulation of a coolant (air), although neither mechanical nor electrical anomaly occurs in a cooling fan.

When cooling fan 30 is in failure, an operation instruction is issued to cooling fan 30 after time t1 at which cooling fan 40 activates, and after time t2 at which secondary battery 10 requires cooling. Actually, however, the coolant (air) is not delivered to coolant path 15.

As to battery temperatures #Tb1 and #Tb2 that keep rising, temperature #Tb2 on the air discharge side becomes higher than temperature #Tb1 on the air intake side, owing to the effect of a backflow of discharge air 90 from DC/DC converter 20. Accordingly, when cooling fan 30 is in failure, power supply device 100 encounters a characteristic phenomenon where a temperature difference Δ#Tb (Δ#Tb=|#Tb1−#Tb2|) becomes larger as cooling fan 40 operates.

Figure 4:
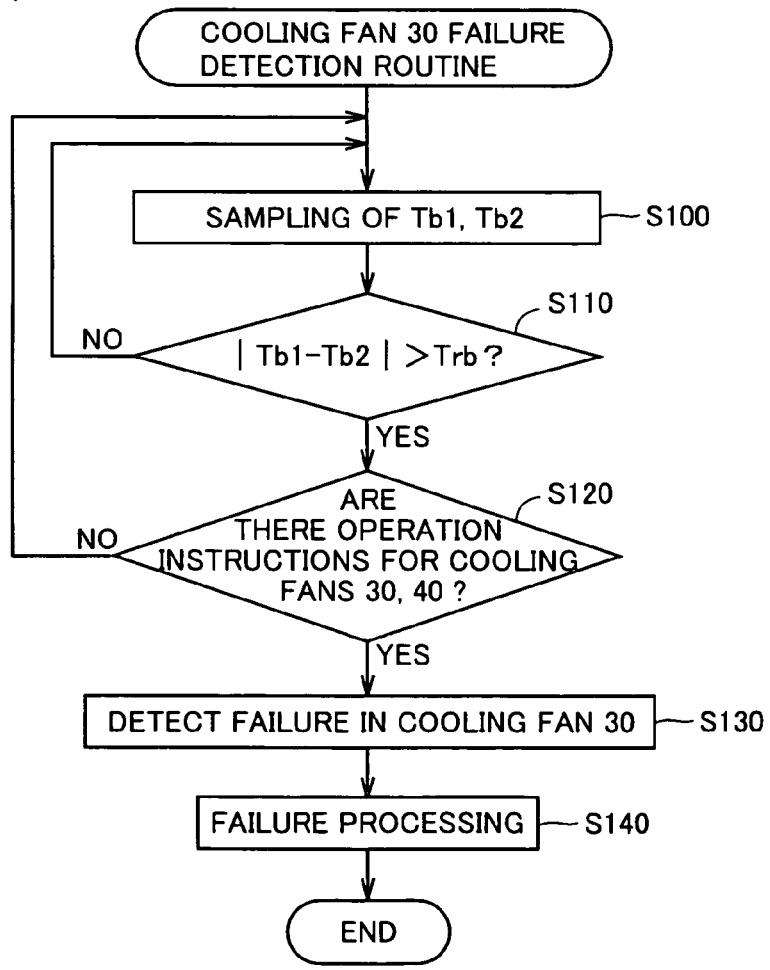
FIG. 4 is a flowchart for describing a method of detecting a failure in a secondary battery cooling fan in the power supply device according to the embodiment of the present invention.

Based on this phenomenon, the failure is detected in power supply device 100 according to the embodiment of the present invention, by a cooling fan failure detection routine described in FIG. 4 without providing a rotation detection sensor at cooling fan 30. The cooling fan failure detection routine shown in FIG. 4 is preprogrammed in ECU 50 for execution.

FIG. 4 is a flowchart for describing a failure detection method for sensing whether or not cooling fan 30 for the secondary battery has sufficient cooling capacity, in other words, whether or not cooling fan 30 is in failure.

Referring to FIG. 4, in the failure detection routine for cooling fan 30 in power supply device 100 according to the embodiment of the present invention, battery temperatures Tb1 and Tb2 detected by temperature sensors 12 and 14 are initially sampled in prescribed cycles (step S100). As to the sampled battery temperatures Tb1 and Tb2, it is determined whether or not the temperature difference between them is larger than a determination reference value Trb, in other words, whether or not |Tb1−Tb2|>Trb is satisfied (step S110).

If the temperature difference |Tb1−Tb2| is larger than determination reference value Trb (when determined as YES in step S110), it is checked whether or not operation instructions are issued to cooling fans 30 and 40 (step S120).

If the temperature difference |Tb1−Tb2| in the secondary battery is increased, even though operation instructions are issued to cooling fans 30 and 40, owing to a backflow phenomenon of the discharge air through air discharge path 80 (when determined as YES in step S120), the failure in cooling fan 30 is detected (step S130).

If the failure of cooling fan 30 is detected (when determined as YES in step S130), failure processing is performed (step S140). As to the failure processing, a user is initially informed that cooling fan 30 is in failure and requires repairing. Furthermore, as the cooling capacity of cooling fan 30 is lowered, such control as to restrict the charge and discharge operation of secondary battery 10 is performed. Accordingly, a fail-soft operation is possible in a state where an output from power supply device 100 is restricted, while heat generation in secondary battery 10 is suppressed.

While the failure of cooling fan 30 is not detected (when determined as NO in steps S110 and S120), the failure determination processing in steps S100-S120 is repeatedly performed in prescribed cycles, based on sampling of battery temperatures Tb1, Tb2.

As such, in the power supply device according to the embodiment of the present invention, the failure of cooling fan 30 can efficiently be detected by utilizing a parallel arrangement configuration of cooling fans 30, 40, based on the temperature difference in secondary battery 10, without providing a failure detection sensor such as a revolution speed sensor.

In contrast, a heat generation site is relatively small in DC/DC converter 20, and hence based only on converter temperature Td detected by single temperature sensor 22, it is possible to sense whether or not cooling fan 40 has sufficient cooling capacity, in other words, whether or not cooling fan 40 is in failure.

Figure 5:
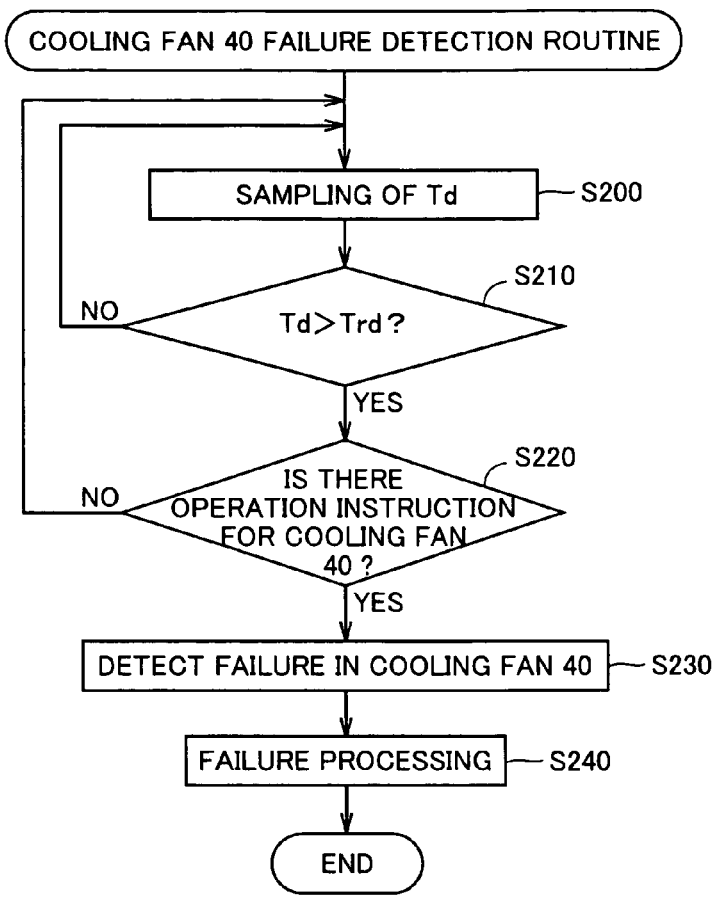
FIG. 5 is a flowchart for describing a method of detecting a failure in a DC/DC converter cooling fan in the power supply device according to the embodiment of the present invention.

FIG. 5 is a flowchart for describing a failure detection method for sensing whether or not cooling fan 40 for the DC/DC converter has sufficient cooling capacity, in other words, for sensing a failure in cooling fan 40.

Referring to FIG. 5, in a failure detection routine for cooling fan 40 in power supply device 100 according to the embodiment of the present invention, converter temperature Td is sampled in prescribed cycles by temperature sensor 22 provided at DC/DC converter 20 (step S200). It is determined whether or not sampled converter temperature Td is larger than a determination reference value Trd (set to satisfy determination reference value Trd≧reference temperature Tdr), in other words, whether or not Td>Trd is satisfied (step S210).

If converter temperature Td is larger than determination reference value Trd (when determined as YES in step S210), it is checked whether or not an operation instruction is issued to at least cooling fan 40 (step S220).

If converter temperature Td rises even though an operation instruction is issued to cooling fan 40 (when determined as YES in step S220), a failure in cooling fan 40 is detected (step S230).

If the failure in cooling fan 40 is detected (when determined as YES in step S230), failure processing similar to that in step S140 is performed (step S240). In other words, a user is informed that cooling fan 40 is in failure, and such control as to restrict power output from DC/DC converter 20 is performed as cooling capacity of cooling fan 40 is lowered. Accordingly, a fail-soft operation is possible in a state where an output from power supply device 100 is restricted, while heat generation in DC/DC converter 20 is suppressed.

While the failure in cooling fan 40 is not detected (when determined as NO in steps S210, S220), the failure determination processing in steps S200-S220 is repeatedly performed in prescribed cycles, based on sampling of converter temperature Td.

As such, DC/DC converter 20, which is a target to be cooled by cooling fan 40, has a configuration where a temperature deviation due to a backflow of the discharge air is less likely to be generated, and hence failure detection in the cooling fan can be performed in accordance with the general configuration, based on the detected temperature value of the target to be cooled.

Power supply device 100 configured to include a secondary battery is mounted to, for example, a hybrid vehicle. In such a case, secondary battery 10 serves as a power supply mainly for a vehicle driving motor, through power conversion by an inverter disposed in a subsequent stage. In contrast, DC/DC converter 20 serves as a power supply for other auxiliary machines and others. If a cooling system is in failure in such a configuration where secondary battery 10 and DC/DC converter 20 are arranged in parallel, it is possible to sense a failure in the cooling fan for a driver and inform him/her that repair is recommended, and continue a fail-soft driving of the vehicle by restricting outputs from secondary battery 10 and DC/DC converter 20.

When power supply device 100 is used for a hybrid vehicle, in particular, an output of secondary battery 10 is increased. Therefore, the larger number of cells is required, resulting in further increase in temperature deviation in secondary battery 10. Accordingly, the power supply device provided with the cooling system according to the embodiment of the present invention is suitable for being mounted to a hybrid vehicle.

Figure 6:
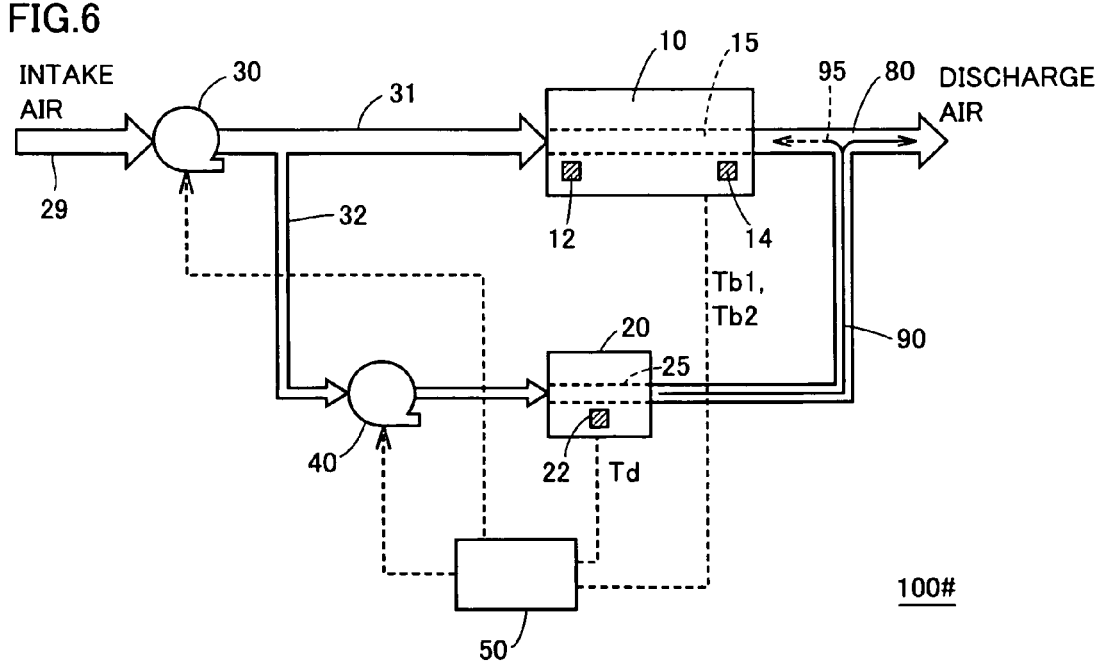
FIG. 6 is a block diagram for describing another example of the configuration of the power supply device according to the embodiment of the present invention.

FIG. 6 shows another example of the configuration of the power supply device according to the embodiment of the present invention.

When FIG. 6 is compared with FIG. 1, a power supply device 100# shown in FIG. 6 is different from power supply device 100 shown in FIG. 1 in that a duct 32 branching off from a duct 31 provided between a discharge side of cooling fan 30 and coolant path 15 is provided, and that an intake side of cooling fan 40 is coupled to duct 32. In other words, power supply device 100# has a configuration where a coolant introduction path 29 is provided only on the intake side of cooling fan 30 so that the coolant can be supplied to both of coolant paths 15, 25.

As a result, cooling fans 30, 40 can share both of an introduction path and a discharge path of the coolant in power supply device 100#, and hence cooling configurations for both of secondary battery 10 and DC/DC converter 20 can be provided in a compact manner.

Other configurations of power supply device 100# are similar to those of power supply device 100 shown in FIG. 1, and hence the detailed description thereof will not be repeated. As to the control of cooling fans 30, 40 by control circuit 50, coordinated control similar to that in power supply device 100 is performed.

Basically, control circuit 50 determines whether cooling of secondary battery 10 is necessary/unnecessary, based on a comparison between battery temperature Tb and reference temperature Tbr, and determines whether cooling of DC/DC converter 20 is necessary/unnecessary, based on a comparison between converter temperature Td and reference temperature Tdr.

Basically, control circuit 50 operates cooling fan 30 when it is determined that cooling of secondary battery 10 is necessary, and makes cooling fan 30 inoperative when it is determined that cooling of secondary battery 10 is unnecessary. Similarly, control circuit 50 basically operates cooling fan 40 when it is determined that cooling of DC/DC converter 20 is necessary, and makes cooling fan 40 inoperative when it is determined that cooling of secondary battery 10 is unnecessary.

Battery temperature Tb and converter temperature Td are temperatures used for determining whether or not cooling of secondary battery 10 and DC/DC converter 20 is necessary. In other words, if a plurality of temperature sensors are disposed at secondary battery 10 and DC/DC converter 20, it is possible to adopt a maximum value or a mean value of the temperatures detected by the respective temperature sensors, or adopt a temperature detected by a temperature sensor provided at a specific portion, as a representative value.

As shown in FIG. 7, control circuit 50 operates both of cooling fans 30 and 40 when Tb>Tbr and Td>Tdr, and makes both of cooling fans 30 and 40 inoperative when Tb≦Tbr and Td≦Tdr.

When Td>Tdr and Tb≦Tbr, cooling of DC/DC converter 20 is necessary while cooling of secondary battery 10 is unnecessary. However, as described above, if only cooling fan 40 is operated, the temperature of secondary battery 10 may rise owing to the generation of backflow component 95 of the discharge air from DC/DC converter 20 having a relatively high reference temperature to secondary battery 10 having a relatively low reference temperature. Accordingly, control circuit 50 operates cooling fan 40 to cool DC/DC converter 20, and at the same time, operates in an auxiliary manner cooling fan 30, an operation of which is originally unnecessary, to prevent the generation of backflow component 95 of discharge air 90 from DC/DC converter.

As in the case described in FIG. 2, the flow rate of the coolant in cooling fan 30 in an auxiliary operation is set to be smaller than that of the coolant during cooling (in operation). Accordingly, the flow rate of the coolant in cooling fan 30 in this case is set to be smaller than that of the coolant in cooling fan 40 operated to cool DC/DC converter 20.

In contrast, when Td≦Tdr and Tb>Tbr, even if only cooing fan 30 corresponding to secondary battery 10 having a relatively low reference temperature is operated, there is less possibility of significant temperature rise in DC/DC converter 20 having a relatively high reference temperature due to the backflow component of the discharge air. Accordingly, control circuit 50 operates cooling fan 30 to cool secondary battery 10, and at the same time, makes inoperative cooling fan 40 corresponding to DC/DC converter 40, without operating cooling fan 40 in an auxiliary manner.

As such, as to the backflow component of the discharge air having a smaller adverse effect on temperature rise, an auxiliary operation of the cooling fan for preventing the backflow generation is not performed, which can prevent increase in power consumption and generation of an operational noise (noise).

If a coolant at an excessively high temperature or an excessively low temperature is supplied to coolant path 15, an operation of secondary battery 10 may be affected adversely. Accordingly, control circuit 50 monitors an intake coolant temperature Tre by a temperature sensor (not shown) provided at a coolant introduction path 29. If intake coolant temperature Tre is high or low out of the prescribed reference range, it is determined that cooling of secondary battery 10 is unnecessary, regardless of battery temperature Tb. In other words, if intake coolant temperature Tre is out of the reference range, control of cooling fan 30 in FIG. 7 is performed as in the case of Tb≦Tbr, regardless of the actual battery temperature Tb.

The operational control of cooling fans 30, 40 described with reference to FIG. 7 can be applied to both of power supply device 100 in FIG. 1 and power supply device 100# in FIG. 6, as described above. In other words, in both of power supply devices 100, 100#, secondary battery 10 and DC/DC converter 20 can both be cooled sufficiently by providing coordinated control shown in FIG. 7 to cooling fans 30, 40 arranged in parallel.

As described above, the power supply device shown in FIG. 6 has a compact configuration that allows both of secondary battery 10 and DC/DC converter 20 to be cooled, and hence is suitable for being mounted on a hybrid vehicle, which requires the power supply device to be disposed in a small space.

In the present embodiment, values measured by temperature sensors provided at secondary battery 10 and DC/DC converter 20 are used as battery temperature Tb and converter temperature Td that are necessary for the operational control of cooling fans 30, 40 by control circuit 50. Alternatively, expected temperature values based on the operating states of secondary battery 10 and DC/DC converter 20 may be used as battery temperature Tb and converter temperature Td. However, it is noted that the control of the cooling fan based on the values measured by the temperature sensors can more reliably maintain secondary battery 10 and DC/DC converter 20 at not more than the control target temperature.

In the power supply devices 100, 100# illustrated in the present embodiment, it is also possible to apply other power supply sources such as other kinds of batteries including fuel cells and others, and a capacitor and others that serve as an electric storage device that stores electric charge supplied externally, instead of secondary battery 10.

In the present embodiment, there has been described a configuration of a power supply device where targets to be cooled (voltage generators) arranged in parallel are a secondary battery and a DC/DC converter having a semiconductor power switching element embedded therein. However, application of the present invention is not limited to such a configuration. In other words, the present invention is applicable without limiting a target to be cooled (voltage generator), a coolant, and a cooling system, as long as the power supply device has a cooling configuration where targets to be cooled (voltage generators) and cooling systems correspond thereto, respectively, are arranged in parallel, and coolant discharge sides of the cooling systems are connected together.

In doing so, it is possible to determine as appropriate the cooling system to be a target of auxiliary operation for preventing a backflow of the discharged coolant, in accordance with property (e.g. control target temperature, heat generating property) of the targets to be cooled (voltage generators). For a configuration where the same kinds of voltage generators and the cooling systems are arranged in parallel, it is preferable to allow each of the cooling systems to operate in an auxiliary manner when the other cooling systems operate.

It should be understood that the embodiment disclosed here is by way of illustration in all aspects and is not to be taken by way of limitation. The scope of the present invention is indicated not by the description above, but by the scope of the claims, and all the modifications in the scope of the claims and the equivalent meanings thereof are intended to be embraced.

INDUSTRIAL APPLICABILITY

The power supply device according to the present invention can be utilized to supply power to various kinds of electric equipment, a typical example of which is equipment mounted to a hybrid vehicle.

The invention claimed is:

1. A power supply device comprising:
   a first voltage generator having a first coolant path allowing a coolant for cooling the first voltage generator to pass therethrough;
   a second voltage generator having a second coolant path allowing the coolant for cooling the second voltage generator to pass therethrough;
   a first cooling system supplying the coolant to a coolant intake side of said first coolant path;
   a second cooling system supplying the coolant to a coolant intake side of said second coolant path;
   a coolant discharge path connected to both of a coolant discharge side of said first coolant path and a coolant discharge side of said second coolant path;
   a first temperature sensor attached to said first voltage generator;
   a second temperature sensor attached to said first voltage generator on the coolant discharge side of said first coolant path, relative to said first temperature sensor; and
   a control circuit controlling an operation of each of said first and second cooling systems,
   when said control circuit issues an operation instruction to each of said first and second cooling systems, said control circuit detecting failure in said first cooling system when a temperature difference between temperature detected by said first temperature sensor and temperature detected by said second temperature sensor is larger than a reference value.

2. The power supply device according to claim 1, further comprising a third temperature sensor attached to said second voltage generator, wherein
   when said control circuit operates said second cooling system to cool said second voltage generator based on a temperature detected by said third temperature sensor, said control circuit also operates said first cooling system in an auxiliary manner to prevent the coolant discharged from said second coolant path from flowing back to said first coolant path through said coolant discharge path even when it is determined that cooling of said first voltage generator is unnecessary based on the temperatures detected by said first and second temperature sensors.

3. The power supply device according to claim 2, wherein a flow rate of the coolant from said first cooling system when said first cooling system is operated in said auxiliary manner is set to be lower than a flow rate of the coolant when said first cooling system is operated to cool said first voltage generator.

4. The power supply device according to claim 1, wherein said first voltage generator is a secondary battery, and
said second voltage generator is a power converter having a semiconductor power switching element embedded therein.

5. A power supply device comprising:
a first voltage generator having a first coolant path allowing a coolant for cooling the first voltage generator to pass therethrough;
a second voltage generator having a second coolant path allowing the coolant for cooling the second voltage generator to pass therethrough;
a first cooling system for supplying the coolant to a coolant intake side of said first coolant path;
a second cooling system for supplying the coolant to a coolant intake side of said second coolant path;
a coolant discharge path connected to both of a coolant discharge side of said first coolant path and a coolant discharge side of said second coolant path; and
a control circuit controlling an operation of each of said first and second cooling systems,
when said control circuit operates one cooling system of said first and second cooling systems, said control circuit also operating the other cooling system of said first and second cooling systems even when cooling of the voltage generator corresponding to said other cooling system is unnecessary.

6. The power supply device according to claim 5, wherein said control circuit controls the operation of each of said first and second cooling systems, based on an output of each of temperature sensors provided at said first and second voltage generators.

7. The power supply device according to claim 5, wherein, when said control circuit operates said one cooling system, and when said control circuit also operates said other cooling system even when cooling of the voltage generator corresponding to said other cooling system is unnecessary, said control circuit sets a flow rate of the coolant from said one cooling system to be relatively higher than a flow rate of the coolant from said other cooling system.

8. The power supply device according to claim 5, wherein said control circuit controls the operation of said first cooling system such that said first voltage generator is maintained to be at not more than a first reference temperature, and controls the operation of said second cooling system such that said second voltage generator is maintained to be at not more than a second reference temperature,
said first reference temperature is lower than said second reference temperature, and
when said control circuit operates said second cooling system to cool said second voltage generator, said control circuit also operates said first cooling system even when cooling of said first voltage generator is unnecessary.

9. The power supply device according to claim 8, wherein when said control circuit operates said second cooling system, said control circuit also operates said first cooling system even when cooling of said first voltage generator is unnecessary, said control circuit sets a flow rate of the coolant from said second cooling system is set to be relatively higher than a flow rate of the coolant from said first cooling system.

10. The power supply device according to claim 5, further comprising:
a first duct provided between a discharge side of said first cooling system and said first coolant path; and
a second duct branching off from said first duct, wherein
an intake side and a discharge side of said second cooling system are coupled to said second duct and said second coolant path, respectively.

11. The power supply device according to claim 5, wherein said control circuit controls the operation of each of said first and second cooling systems such that said first and second voltage generators are maintained to be at not more than a control target temperature and a control target temperature, respectively,
said first voltage generator is a secondary battery,
said second voltage generator is a power converter having a semiconductor power switching element embedded therein, and
said control target temperature of said power converter is higher than said control target temperature of said secondary battery.

12. A method comprising:
applying a coolant to a first voltage generator, the first voltage generator having a first coolant path allowing the coolant to pass through the first voltage generator, the coolant being applied by a first cooling system to a coolant intake side of the first coolant path;
applying the coolant to a second voltage generator, the second voltage generator having a second coolant path allowing the coolant to pass through the second voltage generator, the coolant being applied by a second cooling system to a coolant intake side of the second coolant path;
discharging the coolant from the first and second coolant paths by a coolant discharge path connected to both of a coolant discharge side of said first coolant path and a coolant discharge side of said second coolant path; and
controlling an operation of each of said first and second cooling systems by a control circuit, wherein when the control circuit operates one cooling system of the first and second cooling systems, the control circuit also operates the other cooling system of the first and second cooling systems even when cooling of the voltage generator corresponding to the other cooling system is unnecessary.

13. The method according to claim 12, wherein said control circuit controls the operation of each of said first and second cooling systems, based on an output of each of temperature sensors provided at said first and second voltage generators.

14. The method a according to claim 12, wherein, when said control circuit operates said one cooling system, and when said control circuit also operates said other cooling system even when cooling of the voltage generator corresponding to said other cooling system is unnecessary, said control circuit sets a flow rate of the coolant from said one cooling system to be relatively higher than a flow rate of the coolant from said other cooling system.

15. The method according to claim 12, wherein
said control circuit controls the operation of said first cooling system such that said first voltage generator is maintained to be at not more than a first reference temperature, and controls the operation of said second cooling system such that said second voltage generator is maintained to be at not more than a second reference temperature, said first reference temperature is lower than said second reference temperature, and when said control circuit operates said second cooling system to cool said second voltage generator, said control circuit also operates said first cooling system even when cooling of said first voltage generator is unnecessary.

16. The method according to claim 15, wherein when said control circuit operates said second cooling system, said control circuit also operates said first cooling system even when cooling of said first voltage generator is unnecessary, said control circuit sets a flow rate of the coolant from said second cooling system is set to be relatively higher than a flow rate of the coolant from said first cooling system.

17. The method according to claim 12, further comprising:
a first duct provided between a discharge side of said first cooling system and said first coolant path; and
a second duct branching off from said first duct, wherein
an intake side and a discharge side of said second cooling system are coupled to said second duct and said second coolant path, respectively.

18. The method according to claim 12, wherein
said control circuit controls the operation of each of said first and second cooling systems such that said first and second voltage generators are maintained to be at not more than a control target temperature and a control target temperature, respectively, said first voltage generator is a secondary battery, said second voltage generator is a power converter having a semiconductor power switching element embedded therein, and said control target temperature of said power converter is higher than said control target temperature of said secondary battery.

* * * * *

UNITED STATES PATENT AND TRADEMARK OFFICE
CERTIFICATE OF CORRECTION

| | |
|---|---|
| PATENT NO. | : 7,771,864 B2 |
| APPLICATION NO. | : 10/590235 |
| DATED | : August 10, 2010 |
| INVENTOR(S) | : Nobuaki Kiya et al. |

Page 1 of 1

It is certified that error appears in the above-identified patent and that said Letters Patent is hereby corrected as shown below:

| Column | Line | |
|---|---|---|
| 16 | 55 | Before "according" delete "a". |
| 17 | 16 | After "cooling system" delete "is set". |

Signed and Sealed this

Fifteenth Day of February, 2011

David J. Kappos
*Director of the United States Patent and Trademark Office*